Dec. 23, 1930.    W. D. STARRETT    1,786,319
TRANSMISSION GEARING
Filed Sept. 13, 1927
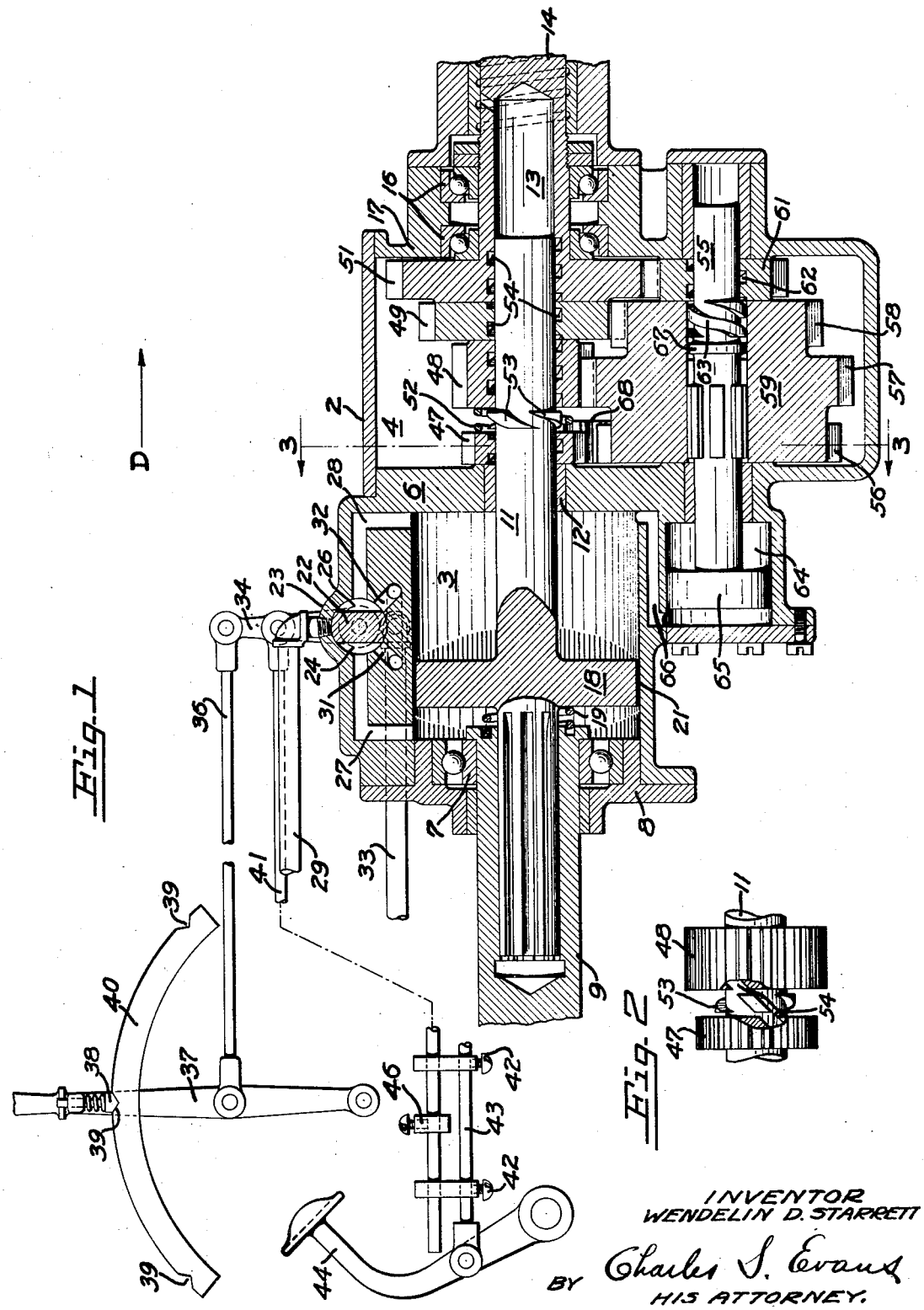
INVENTOR
WENDELIN D. STARRETT
BY Charles S. Evans
HIS ATTORNEY.

Patented Dec. 23, 1930

1,786,319

UNITED STATES PATENT OFFICE

WENDELIN D. STARRETT, OF ALAMEDA, CALIFORNIA

TRANSMISSION GEARING

Application filed September 13, 1927. Serial No. 219,224.

My invention relates to a transmission gearing especially for use in automobiles, and one of the objects of the invention is the provision of a transmission unit adapted to automatically select gears according to the load conditions on the engine with which it is connected.

Another object of the invention is the provision of a transmission which is operated by fluid pressure derived, for example, from a pump of a force feed lubricating system.

Another object of the invention is the provision of a transmission for automobiles which, after the vehicle has been set in motion, may be automatically shifted into neutral upon application of the brake pedal when the automobile is stopped.

Another object of the invention is the provision of a transmission by the use of which the clutch can be eliminated.

Other objects of the invention together with the foregoing will be set forth in the following description of my preferred embodiment of means for practicing the invention and which is illustrated in the drawings accompanying and forming part of the specification. It is to be understood that I do not limit myself to the showing made by the said description and drawings as I may adopt variations of my preferred form within the scope of my invention as set forth in the claims.

Referring to the drawings:

Fig. 1 is a vertical sectional view of my transmission taken in a plane passing thru the longitudinal axis of the propeller shaft. At the left is shown means for admitting oil into the transmission to operate it.

Fig. 2 is a view illustrating the manner in which the selector shaft of Fig. 1 is keyed to pass thru and engage the gears loosely journaled thereon.

The transmission generally used in automobiles requires manual shifting of gears, by the driver of the vehicle. For persons just learning to drive, this is a problem, since it is difficult for them to properly gauge the relative speeds of the engine and vehicle. Even skilled drivers sometimes strip the gears by wrong shifting. The device of the present invention overcomes these difficulties by making the shifting automatic. Furthermore, in driving a vehicle up a hill, the transmission of the present invention will automatically shift into a lower gear when the speed of the engine has decreased to such a point that it begins to labor. It is thus seen that a transmission of the character described makes driving much easier, and especially so in heavy traffic where continual shifting of gears is necessary with the usual transmission.

In terms of broad inclusion, my invention comprises a transmission controlled by hydraulic mechanism, and which, in automobiles that have a force feed lubricating system, may be operated by the oil from the pump. Of course a separate pump and oil supply may be utilized. Means are provided for using the oil under pressure as the medium for causing the shifting of gears, and a control lever is used to actuate a valve for permitting the entrance of oil into the transmission operating means and its exit therefrom. The transmission comprises a driving shaft, a driven shaft and a selector shaft. The selector shaft is splined to the driving shaft while the end portion of the driven shaft is journaled about the selector shaft, so that the selector shaft can be axially shifted. A piston which fits within an oil cylinder is fixed to the selector shaft. Upon the selector shaft are journaled a series of loose gears, the axial movement of which is limited. Fixed to the selector shaft is a key adapted to fit within complementary keyways of the loose gears, and within a keyway in the hollow portion of the driven shaft. When pressure is applied to the piston, such as oil from an oil pump, the selector shaft axially shifts, causing successive engagement of the loose gears with the shaft, and lastly direct engagement of the selector shaft and driven shaft. Means are provided, on a counter-shaft, for connecting each of the gears, as they are engaged, with the driven shaft. The ratio of the gears is such that the mechanical advantage decreases with successive engagements of the loose gears with the selector shaft.

In terms of greater detail, my invention comprises a transmission housed within casing 2 having the cylinder 3, and gear compartment 4 which are separated by the wall 6. Journaled on the bearing 7 in the side wall 8 of the casing is the driving shaft 9 which is connected to the engine of a vehicle. The end portion of the driving shaft is hollow, and a selector shaft 11 is splined therein so as to permit rotation with the driving shaft as well as an axial shifting thereof. The selector shaft projects thru wall 6 and is journaled in bearing 12 therein, while the other end thereof projects into and is journaled within a hollow portion 13 at the end of a driven shaft 14, journaled in bearings 16 in the opposite side wall 17 of the casing. The length of the selector shaft is such that in either of its extreme axial positions, the ends thereof will lie within the hollow portions of the driving and driven shaft.

Means are provided for axially shifting the selector shaft. Fixed and preferably integral with the selector shaft 11, is a piston 18 adapted to slide within the cylinder 3, and a spring 19 is interposed between the piston and driving shaft to limit the movement of the piston toward the driving shaft. Piston 18 is preferably of less diameter than the cylinder, so as to provide a by-pass 21 about the piston, but, if so desired, the piston may be of a tighter fit and openings may be formed in the periphery thereof to form by-passes.

A butterfly valve 22 is journaled within a housing 23 at the top of the cylinder, and has the channels 24 and 26 in the sides thereof which lead into the passages 27 and 28. The passages 27 and 28 communicate with the cylinder so as to optionally permit the application of oil upon each side of the piston. Oil line 29, connected to the pressure side of an oil pump of a lubricating system, leads into the top of housing 23, and when the valve 22 is in a closed position, channels 24 and 26 are not in communication with the oil line, therefore the entrance of oil into the cylinder is prevented.

Communicating with the channels 24 and 26, when the valve 22 is in a closed position, are the ports 31 and 32 respectively. Oil return line 33, connected to the intake side of the oil pump or to the crank case, communicates with both of the ports 31 and 32. It is thus seen that when the valve is turned in a clockwise direction, looking at Fig. 1, to close the port 31, oil under pressure will be forced thru pressure line 29, channel 24, passage 27, and into the cylinder which is preferably always filled with oil. The pressure applied to the piston will cause it and the selector shaft to move forward, and oil will flow out on the other side of the piston thru passage 28, channel 26, port 32, return pipe 33, and to the pump. Upon turning the valve in the reverse direction, the pressure will be applied on the opposite side of the piston and the selector shaft will hence move in the opposite direction.

Means are provided for turning the valve into open or closed position, and means independent of said means are provided for closing the valve if so desired. An end of valve 22 extends outside of the housing, and fixed thereto is an arm 34 which is pivotally connected to rod 36, which is also pivotally connected to the pivoted lever 37. A spring pressed dog 38 on lever 37 is adapted to engage any of the three notches 39 of the quadrant 40. The notches and end of the dog are so beveled that the dog may be easily and quickly slipped out. Central notch 39 is adapted to seat the dog when the valve is closed, while the end notches are for holding the dog when the valve is in either of its open positions. Lever 37 is preferably mounted on the steering wheel of an automobile, so as to be accessible to the driver. A rod 41 is also pivotally connected to the arm 34, and is adapted to slide within the alining lugs 42 adjustably clamped to the brake rod 43, which is pivoted to the brake pedal 44. An adjustable stop 46 is clamped to the arm 41 and in a position between the lugs 42. The relative position of lugs 42 and stop 46 is so adjusted that when the lever 37 is in the right hand notch 39 so that valve 22 is open to cause the piston to move to the right, the right hand lug 42 will hit the stop 46 upon application of the brake pedal. Since the dog can easily slip out of the notch, the lever 37 will be carried to the central notch, and thus shut the valve.

Means are provided to cause a connection between the selector shaft and the driven shaft thru a system of intermediate gears, and means are also provided to cause a direct connection between the selector and driven shaft. Loosely journaled upon the selector shaft is a system of gears 47, 48 and 49. Next to the gear 49 and fixed to the driven shaft is a gear 51. Since a portion of the driven shaft is journaled about the selector shaft. the gear 51 is also journaled thereon. Resilient means such as a spring 52 are interposed between two of the loose gears of the series to separate the series into two portions. Axial movement of the loose gears is limited by the wall 6 and fixed gear 51. Although the drawing shows two loose gears 48 and 49 in one portion of the series and one gear 47 in the other, it is understood that any number of loose gears may be used.

Upon the selector shaft and integral therewith is a key 53 pitched in the form of a left hand screw. The width of the key is less than the thickness of the smallest gear. A keyway 54 of a pitch complementary to that of the key is threaded in the bore of each of the loose gears, and also of the fixed gear 51 and in the end of the hollow portion of the driven shaft. Upon application of pressure on the piston, the key 53 will screw thru the gears and cause successive engagement between each of the loose gears and selector shaft, when the driving shaft is rotated. After the key has passed thru the gears 48 and 49, the selector and driven shafts will be engaged, causing the driven shaft to be directly driven by the engine. The diameters of gears 48, 49 and 51 progressively increase.

In the bottom of the gear compartment 4 is journaled a counter-shaft 55 parallel to the selector shaft 11. Shaft 55 is adapted to shift axially within a series of gears 56, 57 and 58 integral with hub 59 which is splined to the counter-shaft. Gears 57 and 58 are respectively in mesh with loose gears 48 and 49 of the selector shaft. Adjacent gear 58 and loosely journaled on the counter-shaft is a loose gear 61 in mesh with gear 51, and having a pitched keyway 62 adaped to engage with a complementary pitched key 63, also in the form of a left hand screw, and fixed on the counter-shaft.

The end of the counter-shaft, opposite to that upon which the loose gear 61 is journaled, projects into a cylinder 64 and rests against a piston 65 adapted to slide within the cylinder. The left end of cylinder 64 is connected by a passage 66 to the right end of cylinder 3, so that when pressure is applied on the right side of piston 18, oil under pressure will pass thru passage 66 and pressure will be applied to piston 65; therefore the counter-shaft will be forced toward the right. Application of oil under pressure on the left side of piston 18 will cause very little pressure on piston 65, since the passage 66 is not then in communication with the pressure side of cylinder 3. However, the pressure in the latter case will be sufficient to cause the selector shaft to move to the right, if no great resistance is offered to its movement. It is thus seen that when pressure is applied on the right side of piston 18 to cause the selector shaft to move to the left, an equal pressure is applied to piston 65. When pressure is applied on the left side of piston 18 to cause the selector shaft to move to the right, only a slight pressure is applied to piston 65.

When the counter-shaft rotates and is urged to the right due to application of pressure upon piston 65, it will slide thru the hub 59 until key 63 is in engagement with keyway 62 of loose gear 61, and further motion is prevented when shoulder 67, fixed to the counter-shaft, hits the side of loose gear 61. Axial movement of the gears on the counter-shaft is prevented, since they are adjacent to each other, and the end gears abut against the side walls of the compartment.

Gear 56, on the counter-shaft, is in mesh with an idle gear 68 which is also in mesh with loose gear 47; so that when the loose gear 47 is engaged by the key on the selector shaft it will cause the counter-shaft to rotate in a direction opposite to that when the other loose gears on the selector shaft are engaged.

*Operation.*—Assuming that the key 53 is in neutral position between loose gears 47 and 48, that the valve 22 is closed, the cylinder 3 is filled with oil, and that the engine is functioning to turn the selector shaft in a clockwise direction, looking in a direction indicated by the arrow D of Fig. 1. Since the key is in neutral position, the selector shaft will rotate without engaging any of the gears.

In order to avoid ambiguity, further description of the direction of rotation of the gears and shafts is with reference to the direction indicated by arrow D.

To drive the vehicle in a forward direction, lever 37 is pulled to the right until the dog 38 catches in the right hand notch 39. Valve 22 opens and, as previously rec'ted, oil under pressure passes from the oil pump thru passage 27, and on the left side of the piston to cause it to move to the right. The oil on the right hand side of the piston being under a negative pressure with respect to that on the left side passes thru passage 28 thru the pipe 33 to the intake side of the oil pump. Since the selector shaft rotates in a clockwise direction, and since key 53 is of left hand pitch, the keyway of gear 48 will screw onto key 53 since the selector-shaft is being pushed thru the gear. This will cause engagement between gear 48 and the selector shaft, and therefore gear 48 will also turn in a clockwise direction. At the moment that this engagement occurs, gear 57, being in mesh with the gear 48, will rotate in a counter-clockwise direction, and since the latter gear is splined to the counter-shaft, the counter-shaft will also rotate in a counter-clockwise direction, but the application of the slight pressure on piston 65 tends to push the countershaft toward its loose gear. Therefore the left hand key 63 of the counter-shaft, will screw into keyway 62, since very little resistance is offered to the counter-shaft movement, as it is rotating in a counter-clockwise direction. This causes the loose gear to turn in a counter-clockwise direction and fixed gear 51 will therefore rotate in a clockwise direction, since it is in mesh with gear 61. The driven shaft will therefore turn in a clockwise direction. When the shoulder 67 hits the side of loose gear 61, further movement of the counter-shaft is prevented. Fixed gear 58 being in mesh with gear 49 will cause the latter to freely rotate upon the selector shaft, but since gear 58 is of less diameter than gear 57, and gear 49 is of greater diameter than gear 48, gear 49 will turn at a lesser speed than the engaged gear 48, which rotates at the speed of the selector shaft. Similarly fixed gear 51 and the driven shaft being both free to turn about the selector shaft, will rotate at a lesser speed than gear 49, hence when gear 48 is engaged the mechanical advantage is the greatest, causing this engagement to correspond to low gear. The entire action occurs almost instantaneously.

As the key 53 travels thru the keyway of gear 48 due to the oil pressure on the piston, the gear will tend to revolve a trifle faster than the speed of rotation of the selector shaft, causing the gear to screw off of the key 53, for the selector shaft is pushed therethru. The moment that key 53 leaves the keyway of gear 48, the first portion thereof will enter the keyway of gear 49, but since the gear 48 rotates faster than gear 49, the former will slip off of the key without stripping it. The gear 49 being then engaged will rotate at a faster speed than before, since it is now directly connected to the selector shaft, and hence drive the driven shaft thru gear 58, engaged gear 61 and fixed gear 51, at a faster speed. This corresponds to second gear.

The engagement of the key 53 with the fixed gear 51 and the driven shaft is exactly the same as the mechanical steps which occur when the key leaves gear 48 to enter gear 49. When this engagement of a direct connection between the selector and driven shafts occurs, and the key is entirely within the keyway of the fixed gear and driven shaft, the piston will be to the extreme right and the pressure of the oil will hold the piston in that position. The by-pass 21 will permit a flow of oil past the piston and back to the oil pump. Gear 51 will then turn at the same speed as the selector shaft; therefore, the counter-shaft loose gear 61 will rotate at a much greater speed. As a result, the loose gear 61, rotating in a counter-clockwise direction at a high speed, tends to screw off of the key 63, but since the gear cannot move in an axial direction, the counter-shaft will screw out of engagement therewith and when this occurs, the counter-shaft, its gears and gears 48 and 49 will remain practically stationary while gear 61 will idle. Therefore, gears 48 and 49 being no longer engaged will practically cease rotating, except for that due to frictional contact with the selector shaft. The direct connection of the selector and driven shafts corresponds to high gear.

If it is desired to go back into neutral, lever 37 is moved to its central position to close valve 22; or if the vehicle is stopped by application of the brake, lug 42 will hit stop 46 and automatically pull the lever 37 to central position. The oil is then shut off. Since pressure is no longer applied to the piston, the selector shaft rotating in a clockwise direction will now screw the left hand key out of the complementary keyways, for with respect to the direction looking toward the driving shaft, the selector shaft is rotating counter-clockwise. As this occurs, the key 53 will enter the keyway of gear 49 and hence it will become engaged with the selector shaft causing turning thereof, and in a clockwise direction. Therefore, gear 58 will turn, and the counter-shaft will revolve with the gear in a counter-clockwise direction, causing gear 57 to turn gear 48. Since the key on the counter-shaft is a left hand key, and since the counter-shaft is rotating in a counter-clockwise direction, the key will again screw into the complementary keyway of gear 61 and gear 61 will become engaged with the counter-shaft. Since it is in mesh with gear 51, the fixed gear will turn at a slower speed. The pitch of the key 53 is so designed, as is seen more clearly in Fig. 2, that when the key enters the keyway of gear 49 the rotation of gear 49 in a clockwise direction will pull the key out of gear 51. In other words, gear 51 rotates at the speed of the selector shaft and when the key enters gear 49 this gear will then rotate at the speed of the shaft, but when this happens gear 61 becomes engaged with the counter-shaft and starts to rotate, thus slowing up the rotation of gear 51, and hence the keyway of gear 49, as it engages the key 53, will pull it out of the gear 51. This action occurs almost instantaneously.

In a similar manner, the selector shaft will screw thru gears 49 and 48 until neutral position of the key 53 is reached. The key will not screw into gear 47 since the piston strikes spring 19 which prevents the key from entering the keyway of gear 47 unless pressure is applied on the opposite side of the piston. When the neutral position is reached, the selector shaft will no longer engage its gears, but the driven shaft will be rotated by the wheels of the automobile and cause gear 61 to rotate and since axial movement of the gear is prevented, the counter-shaft will screw out of the gear. The disengagement of the key 53, when it travels into neutral position, occurs almost instantaneously.

In going into reverse from neutral, the lever is moved to the left causing oil pressure on the right hand side of the piston. As the selector shaft is turning in a clockwise direction, and since the key 53 is of the same pitch as the keyway of gear 47, this gear will become engaged and rotate in the same direction as the other loose gears turn when engaged. The spring 19 limits the movement of the piston to the left. Since the idle gear 68 is in mesh with gears 47 and 56, gear 56 will turn in an opposite direction than when gears 48 and 49 are engaged and the counter-shaft will consequently turn in a clockwise direction, that is, in a direction reverse from that when gears 48 and 49 are engaged. As the counter-shaft rotates it is urged toward its loose gear 61 due to the direct application of pressure on piston 65, and therefore loose gear 61 will screw onto the key 63 of the counter-shaft in a manner similar to that when key 53 engages gears 48, 49 and 51. At the same time, it will turn with the counter-shaft. This will cause gear 51 with which gear 61 meshes, to turn in a counter-clockwise direction and hence the vehicle will move backward. When the lever 39 is shifted into neutral, the piston will move to the right as previously described, and also aided by the force exerted by spring 19. The key 53 will then move into neutral, but key 63 will remain engaged with loose gear 61, since it is rotating in a clockwise direction. This makes no difference for regardless of the next operation, whether to go in reverse or forward, the counter-shaft loose gear must be engaged.

Suppose the automobile is going forward up a steep hill, as the engine labors its speed of rotation will decrease and the oil pressure will fall off, if the oil pump is driven by the engine which is the case in most automobiles. Inasmuch as the oil passes thru the by pass of the piston and since the pressure is falling off, the piston will slip back and the selector shaft will shift out of high and engage second gear, and when the engine speeds up it will re-engage the driven shaft. The movement of the key in and out of the gears is the same as previously described.

From the previously recited description, it is apparent that, if the oil pressure is supplied by means of a pump driven by the vehicle engine, the pressure will increase with increase of engine speed. Therefore, the speed at which the transmission is shifted can be governed by controlling the speed of the engine.

Although I have described the transmission of the present invention in use without a clutch, the device can be used with a clutch if so desired.

I claim:

1. A transmission comprising a driving shaft, a driven shaft, an axially shiftable selector shaft mounted for rotation with one of said shafts, a loose gear journaled on the selector shaft, a pitched key on the selector shaft for screwing into and engaging a complementary pitched keyway in the loose gear, means for shifting the selector shaft to cause engagement of the loose gear with the selector shaft, and means for connecting the engaged gear with the other shaft.

2. A transmission comprising a driving shaft, a driven shaft, an axially shiftable selector shaft mounted for rotation with one of said shafts, the other shaft having a portion journaled about the selector shaft, a loose gear journaled on the selector shaft, a pitched key on the selector shaft for screwing into and successively engaging a complementary pitched keyway in the loose gear and in the other shaft, means for shifting the selector shaft to cause engagement first with the loose gear and then with the other shaft, and means for connecting the engaged gear with the other shaft.

3. A transmission comprising a driving shaft, a driven shaft, an axially shiftable selector shaft mounted for rotation with one of said shafts, an axially movable counter-shaft, a loose gear journaled on the selector shaft, a gear fixed to the other shaft, a gear on the counter-shaft and in mesh with the loose gear, another gear on the counter-shaft in mesh with the fixed gear, and means for successively engaging the loose gear and then the other shaft with the selector shaft.

4. A transmission comprising a driving shaft, a driven shaft, an axially shiftable selector shaft mounted for rotation with one of said shafts, an axially movable counter-shaft, a series of loose gears journaled on the selector shaft, a gear fixed to the other shaft, a complementary series of gears on the counter-shaft and in mesh with the loose gears, another gear on the countershaft in mesh with the fixed gear, and means for successively engaging each of the loose gears and then the other shaft with the selector shaft.

5. A transmission comprising a driving shaft, a driven shaft, an axially shiftable selector shaft mounted for rotation with one of said shafts, an axially shiftable counter-shaft, a series of loose gears journaled on the selector shaft, a gear fixed to the other shaft, a complementary series of gears splined to the counter-shaft and in mesh with the loose gears, a loose gear journaled on the counter-shaft and in mesh with the fixed gear, means for engaging the counter-shaft with its loose gear, and means for successively engaging each of the selector shaft loose gears and then the other shaft with the selector shaft.

6. A transmission comprising a driving shaft, a driven shaft, an axially shiftable selector shaft mounted for rotation with one of said shafts, an axially shiftable counter-shaft, a series of loose gears journaled on the selector shaft, a gear fixed to the other shaft, a complementary series of gears splined to the counter-shaft and in mesh with the loose gears, a loose gear journaled on the counter-shaft and in mesh with the fixed gear of the other shaft, means for preventing axial movement of the gears on the counter-shaft, means for engaging the counter-shaft with its loose gear, and means for successively engaging each of the loose gears on the selector shaft, and then the other shaft with the selector shaft.

7. A transmission comprising a driving shaft, a driven shaft, an axially shiftable selector shaft mounted for rotation with one of said shafts, an axially movable counter-shaft, a series of loose gears journaled on the selector shaft, a gear fixed for rotation with the other shaft, means for successively engaging the loose gears and then the driven shaft with the selector shaft, and means on the counter-shaft for connecting each of the engaged loose gears with the other shaft.

8. A transmission comprising a driving shaft, a driven shaft, an axially shiftable selector shaft mounted for rotation with one of said shafts, a series of loose gears journaled on the selector shaft, a gear fixed for rotation with the other shaft, means for successively engaging the loose gears and then the other shaft with the selector shaft, an axially shiftable counter-shaft, gears in mesh with the loose gears and splined to the counter-shaft, a loose gear on the counter-shaft in mesh with the fixed gear of the other shaft, and means for engaging the counter-shaft with its loose gear only when the loose gears of the selector shaft are engaged and for disengaging said gear when the other shaft is engaged.

9. A transmission comprising a driving shaft, a driven shaft, an axially shiftable selector shaft mounted for rotation with one of said shafts, a series of loose gears journaled on the selector shaft, resilient means for separating a portion of the loose gears, means for limiting axial movement of the loose gears, means for engaging the loose gears with the selector shaft, and means for connecting an engaged gear with the other shaft.

10. A transmission comprising a driving shaft, a driven shaft, an axially shiftable selector shaft mounted for rotation with one of said shafts, a series of loose gears journaled on the selector shaft, a pitched key on the selector shaft for engaging a complementary pitched keyway in each loose gear, resilient means for separating a portion of the loose gears, means for limiting axial movement of the loose gears, means for shifting the selector shaft to cause engagement thru the loose gears, and means for connecting an engaged gear with the other shaft.

11. A transmission comprising a driving shaft, a driven shaft, an axially shiftable selector shaft mounted for rotation with one of said shafts, a series of loose gears journaled on the selector shaft, a pitched key on the selector shaft for engaging a complementary pitched keyway in each of the loose gears, resilient means for separating a portion of the loose gears, means for limiting axial movement of the loose gears, means for shifting the selector shaft to cause engagement thru the loose gears, and means for connecting an engaged gear with the other shaft including means for varying the speed of rotation of the loose gears and other shaft.

12. A transmission comprising a driving shaft, a driven shaft, an axially shiftable selector shaft mounted for rotation with one of said shafts, a series of loose gears journaled on the selector shaft, a pitched key on the selector shaft, a complementary pitched keyway in each of the loose gears, resilient means for separating a portion of the loose gears, means for limiting axial movement of the loose gears, means for shifting the selector shaft to cause engagement thru the loose gears, means for connecting an engaged gear in one portion of the series with the other shaft to cause it to rotate in one direction, and means associated with said connecting means and with a gear in the other portion of the series to rotate the other shaft in a reverse direction.

13. A transmission comprising a driving shaft, a driven shaft, an axially shiftable selector shaft mounted for rotation with one of said shafts, a series of loose gears journaled on the selector shaft, a pitched keyway in each of the loose gears, a spring about the selector shaft for separating a portion of the loose gears, means for limiting axial movement of the loose gears, means for shifting the selector shaft to cause engagement with the loose gears, and means for connecting an engaged gear with the other shaft.

14. A transmission comprising a driving shaft, a driven shaft, an axially shiftable selector shaft mounted for rotation with one of said shafts, a loose gear journaled on the selector shaft, means for engaging the loose gear with the selector shaft, a piston having a by-pass and movable with the selector shaft, a cylinder within which the piston slides, hydraulic means for optionally applying pressure on each side of the piston to shift the selector shaft in and out of engagement with the loose gear, and means for connecting the engaged gear with the other shaft.

15. A transmission comprising a driving shaft, a driven shaft, an axially shiftable selector shaft mounted for rotation with one of said shafts, a loose gear journaled on the selector shaft, means for engaging the loose gear with the selector shaft, a piston movable with the selector shaft, a cylinder within which the piston slides, means for optionally admitting oil under pressure on each side of the piston to shift the selector shaft in and out of engagement with the loose gear, means for permitting the escape of oil from the opposite side of that upon which pressure is applied, and means for connecting the engaged gear with the other shaft.

16. A transmission comprising a driving shaft, a driven shaft, an axially shiftable selector shaft mounted for rotation with one of said shafts, a loose gear journaled on the selector shaft, means for engaging the loose gear with the selector shaft, a piston movable with the selector shaft, a cylinder within which the piston slides, resilient means interposed between the piston and one of said shafts, means for optionally applying pressure on each side of the piston to shift the selector shaft in and out of engagement with the loose gear, and means for connecting the engaged gear with the other shaft.

17. A transmission comprising a driving shaft, an axially shiftable selector shaft mounted for rotation with one of said shafts, a loose gear journaled on the selector shaft, means for engaging the loose gear with the selector shaft, a piston movable with the selector shaft, a cylinder within which the piston slides, an oil line leading into said cylinder, a pump for said oil line, a valve for admitting oil on a side of the piston to shift the selector shaft into engagement with the loose gear, means for opening and closing said valve, independent means for closing said valve, and means for connecting the engaged gear with the other shaft.

18. A transmission comprising a driving shaft, a driven shaft, an axially shiftable selector shaft mounted for rotation with one of said shafts, an axially movable counter-shaft, a loose gear journaled about the selector shaft, means for engaging the loose gear with the selector shaft, and means including means operable by movement of the countershaft for connecting the engaged gear with the other shaft.

19. A transmission comprising a driving shaft, a driven shaft, an axially shiftable selector shaft mounted for rotation with one of said shafts, a plurality of loose gears journaled on the selector shaft, a pitched key on the selector shaft for engaging complementary pitched keyways in the loose gears, means for automatically causing successive engagement of the selector shaft with each of the loose gears, and means for connecting an engaged loose gear with the other shaft.

20. The combination with a vehicle having a brake mechanism, an internal combustion engine, and a force feed lubricating system therefor, of a transmission including selective mechanism, means responsive to load conditions on said engine and operated by the pressure in said lubricating system for actuating said selective mechanism, and means associated with the brake mechanism for cutting off the application of pressure.

21. A transmission comprising a driving shaft, a driven shaft, an axially shiftable selector shaft mounted for rotation with one of said shafts, a loose gear journaled about the selector shaft, means for engaging the loose gear with the selector shaft, means for connecting the engaged gear with the other shaft, a piston movable with the selector shaft, a cylinder within which the piston slides, and hydraulic means for optionally applying pressure on each side of the piston to shift the selector shaft in and out of engagement with the loose gear, said piston having a by-pass to allow passage of fluid therepast when the selector shaft is shifted.

22. A transmission comprising a driving shaft, a driven shaft, an axially shiftable selector shaft mounted for rotation with one of said shafts, a plurality of loose gears journaled about the selector shaft, a pitched key mounted for rotation and movement with the selector shaft for screwing into and engaging complementary pitched keyways in the loose gears, means for automatically causing successive engagement of the selector shaft with each of the loose gears, and means for connecting an engaged loose gear with the other shaft.

23. A transmission comprising a driving shaft, a driven shaft, an axially shiftable selector shaft mounted for rotation with one of said shafts, a loose gear journaled about the selector shaft, a pitched key mounted for rotation and movement with the selector shaft for screwing into and engaging a complementary pitched keyway in the loose gear, means for shifting the selector shaft to cause engagement of the loose gear with the selector shaft, and means for connecting the engaged gear with the other shaft.

24. The combination with a vehicle having a brake mechanism and a motor, the speed of which varies with the load thereon, of a transmission including selective mechanism, means responsive to the speed of said motor for actuating said selective mechanism, and means associated with the brake mechanism for interrupting the action of said actuating means.

In testimony whereof, I have hereunto set my hand.

WENDELIN D. STARRETT.